United States Patent

[11] 3,584,460

[72] Inventor Keith A. Boyd
  Mt. Clemens, Mich.
[21] Appl. No. 803,161
[22] Filed Feb. 28, 1969
[45] Patented June 15, 1971
[73] Assignee Eaton Yale & Towne Inc.
  Cleveland, Ohio

[54] HYDROSTATIC TRANSMISSION
  17 Claims, 5 Drawing Figs.
[52] U.S. Cl. .................................................. 60/53
[51] Int. Cl. ........................................... F15b 15/18
[50] Field of Search ................................... 60/53 B, 53,
  53 A, 52; 103/203

[56] References Cited
  UNITED STATES PATENTS
  3,003,309  10/1961  Bowers .................... 60/53
  3,300,969  1/1967   Barden .................... 60/52
  3,376,703  4/1968   Buczynski ................ 60/53

Primary Examiner—Edgar W. Geoghegan
Attorney—Yount and Tarolli

ABSTRACT: An improved hydrostatic transmission includes a hydraulic pump which is connected with a hydraulic motor by fluid conduits. A makeup pump is connected with these conduits to provide for the maintenance of a minimum fluid pressure in the conduits by replacing or making up any fluid which is exhausted or lost during operation of the hydrostatic transmission. A pair of pressure responsive valve assemblies control the flow of fluid from the makeup pump to the fluid conduits. To compensate for a transient or short duration decrease in the fluid pressure in one of the conduits, the associated valve assembly discharges fluid from the valve assembly into the conduit while blocking fluid flow from the makeup pump to the conduit. Toward the end of the short duration decrease in pressure, the fluid pressure in the conduit begins to rise back toward the desired minimum pressure and fluid is returned to the valve assembly from the conduit. In this manner a transient or short duration decrease in pressure in the conduit is compensated for without the addition of unnecessary makeup fluid.

INVENTOR
KEITH A. BOYD

BY Yount, Flynn & Tarolli
ATTORNEYS

HYDROSTATIC TRANSMISSION

This invention relates generally to a hydrostatic transmission and ore particularly to a means for compensating for transient pressure variations in a fluid circuit of a hydrostatic transmission without the additions of unnecessary makeup fluid.

A known hydrostatic transmission includes a hydraulic pump and motor which are innerconnected by a "closed loop" fluid circuit. A makeup pump is connected with both sides of the fluid circuit to replace or makeup fluid which may be lost through an exhausting of the circuit to a reservoir through a high pressure relief valve or due to fluid leadage from the circuit during operating of the hydrostatic transmission. A known hydrostatic transmission having such a construction is illustrated in U.S. Pat. No. 3,376,703 to Buczynski.

While these known hydrostatic transmissions have been generally satisfactory, difficulty has bee encountered due to erratic operation of the fluid motor during low speed and low torque load conditions. This erratic operation of the hydrostatic transmission is believed to be caused by intermittent and unnecessary operation of a check valve for controlling the flow of makeup fluid to the high pressure side of the "closed loop" fluid circuit interconnecting the pump and motor. This intermittent operation operation of the check valve is believed to be the result of transient or short duration decreases in the fluid pressure in the high pressure side of the closed loop circuit. It is theorized that the short duration decreases in pressure are due to instantaneous variations in the displacement of the fluid motor during its operation.

Accordingly, it is an object of this invention to provided a new and improved hydrostatic transmission which is capable of relatively smooth operation during low speed and low torque load conditions.

Another object of this invention is to provide a new and improved hydrostatic transmission having a pump and motor interconnected by a fluid conduit with means to compensate for instantaneous variations in the displacement of the motor without the addition of unnecessary makeup fluid to the fluid circuit between the pump and motor.

Another object of this invention is to provide a new and improved hydrostatic transmission having a pump and motor interconnected by a fluid circuit wherein an assembly responds to long duration decreases in fluid pressure in the circuit by enabling necessary makeup fluid to be added to the fluid circuit and compensates for transient or short duration decreases in fluid pressure in the circuit without adding unnecessary makeup fluid to the fluid circuit.

Another object of this invention is to provide a new and improved hydrostatic transmission having a valve means for controlling the addition of fluid to a fluid circuit between the pump and motor of the hydrostatic transmission wherein the valve means compensates for short duration decreases in fluid pressure in the circuit by discharging fluid from the valve means during the short duration decrease in pressure and by accepting fluid from the circuit as the pressure in the circuit increases.

These and other objects and features of the invention will become more apparent upon a consideration of the following description taken in connection with the accompanying drawings wherein.

Figure 1:
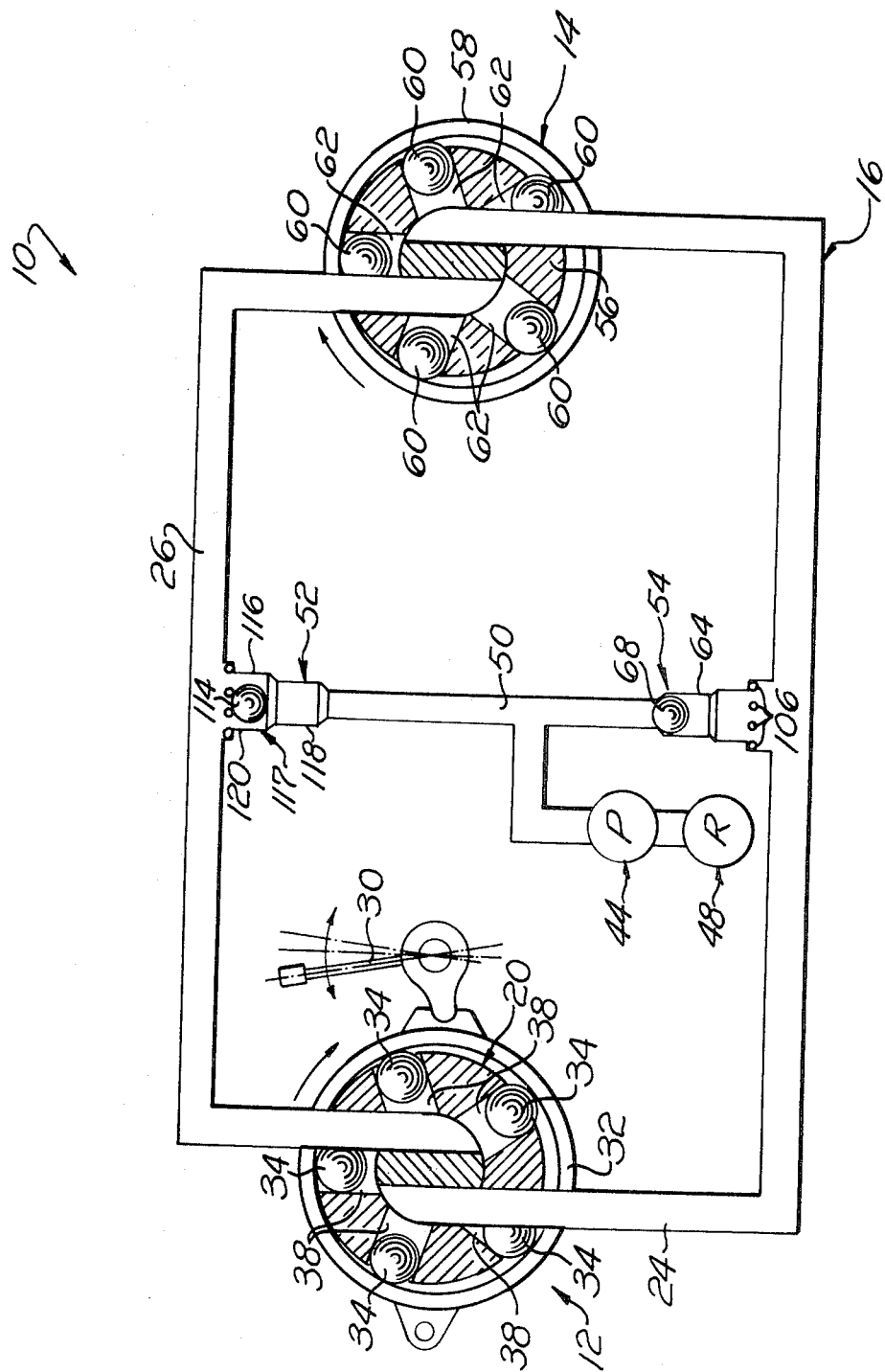
FIG. 1 is a schematic illustration of a hydrostatic transmission constructed in accordance with the present invention.

The present invention relates to a hydrostatic transmission having a hydraulic pump and motor which are interconnected by a fluid circuit. A makeup pump is connected with this circuit to replace fluid lost from the circuit due to leaks or exhausting of fluid to a reservoir through a high pressure relief valve. A valve assembly controls the addition of makeup fluid to the fluid circuit and is operable to an open condition in response to only relatively long duration decreases in the fluid pressure in the circuit. The valve assembly compensates for short duration decreases in the fluid pressure in the circuit by discharging fluid from the valve assembly into the fluid circuit. As a short duration decrease in pressure ends and the pressure in the fluid circuit increases, the fluid which was added to the circuit from the valve assembly is no longer needed and the valve assembly accepts fluid from the circuit.

A hydrostatic transmission 10 embodying the present invention includes a reversible hydraulic pump 12 which is connected with a reversible hydraulic motor 14 by a "closed loop" fluid circuit 16. During operation of the hydrostatic transmission 10, a carrier or rotor 20 of the pump 12 is rotated by an engine or other suitable source of power to pump fluid under pressure through a conduit 24 to the motor 14. This relatively high pressure fluid causes the ball piston type motor 14 to operate in a known manner to drive a vehicle or perform other operations. Relatively low pressure fluid is conducted from the motor 14 through a conduit 26 back to the pump 12 for recirculation.

The speed of operation of the motor 14 is controlled by means of a shift lever 30 which is operable to vary the effective displacement of the pump 12 and the rate of fluid flow through the conduit 24. To accomplish this, movement of the shift lever 30 moves a cam ring 32 to vary the stroke of ball type pistons 34 relative to the carrier or rotor 20 which has cylinders 38 in which the pistons 34 are slidably mounted. As is well known to those skilled in the art, the direction of operation of he motor 14 is reversed by reversing the direction of operation of the pump 12. This results in relatively high pressure fluid being pumped through the conduit 26 to the motor 14 and returned to the pump 12 from the motor 14 through the conduit 24.

During operation of the hydrostatic transmission 10 it may be necessary to exhaust the fluid circuit 16 through a high pressure relief valve (not shown) to a suitable low pressure reservoir. In addition, fluid may be lost from the circuit 16 due to leakage and other causes. A makeup pump 44 is operable to replace exhausted or lost fluid by pumping fluid from a reservoir 48 through a conduit 50 and valve assembly 52 to the conduit 26 on the low pressure side of the fluid circuit 16. When the direction of operation of the pump 12 is reversed, the makeup pump 44 pumps fluid through the conduit 50 and a valve assembly 54 to what is then the low pressure fluid conduit 24. It should be noted that the valve assemblies 52 and 54 are of the nonreturn or check type to prevent high pressure fluid from flowing from either the conduit 24 or 26 to the conduit 50.

During operation of the hydrostatic transmission 10, the fluid pressure in the high pressure fluid conduit of the circuit 16 tends to fluctuate or vary even though the pump 12 is operated at a constant speed. This variation in fluid pressure in the high pressure fluid conduit appears to be due to variations in the instantaneous displacement of the motor 14. Variations in the instantaneous displacement of the motor 14 result from rotation of a rotor 56 relative to a housing 48 of the motor 14. This rotation of the rotor 56 causes pistons 60 to move axially along cylinders 62 formed in the rotor 56.

When the motor 14 is being operated in a clockwise direction (as viewed in FIG. 1), the high pressure fluid conduit in the fluid circuit 16 is the conduit 24. However, under low speed and low torque load conditions, the average fluid pressure in the conduit 24 is relatively low. Transient or short duration variations in fluid flow and pressure in the conduit 24 can occur even though the pump 12 is operated at a constant speed. It is believed that these short duration variations in flow and pressure in the fluid conduit 24 are caused by instantaneous variations in the displacement of the motor 14 and can result in the fluid pressure in conduit 50 being slightly greater for a short time than the fluid pressure in the conduit 24. The valve assembly 54 then tends to open under the influence of the differential in fluid pressure between the conduits 24 and 50.

If the valve assembly 54 is allowed to operate to the open condition under the influence of transient variations in the fluid pressure in the conduit 24, makeup fluid flows from the conduit 50 to the conduit 24 under the influence of the pump 44. However, the addition of makeup fluid to the conduit 24 results in an excess amount of fluid being contained within the conduit once the transient or short term decrease in pressure has passed due to continued operation of the motor 14.

To minimize erratic operation of the motor 14 due to instantaneous variations in the displacement of the motor or other causes even though the pump 12 may be driven at a constant speed, the valve assembly 54 compensates for transient or short duration changes in fluid pressure in the conduit 24 without adding unnecessary makeup fluid to the fluid circuit 16. To accomplish this, the valve assembly 54 responds to the presence of a transient or short duration depression in the fluid pressure in the conduit 24 by discharging fluid contained within the valve assembly into the conduit 24. As the transient depression in the pressure passes, a substantially similar amount of fluid is returned to the valve assembly 54 from the conduit 24. Since the amount of fluid returned to the valve assembly 54 is substantially equal to the amount of fluid previously discharged from the valve assembly, the occurrence of a transient variation in fluid pressure in the conduit 24 is compensated for without the addition of unnecessary makeup fluid.

During a transient depression in fluid pressure in the conduit 24, the valve assembly 54 blocks the flow of makeup fluid from the conduit 50 to the conduit 24. However when the fluid is lost or exhausted from the fluid circuit 16, makeup fluid must be added to the fluid circuit. Therefore, the valve assembly 54 is operated to an open condition in response to a relatively long duration decrease in the fluid pressure in the conduit 24. This enables makeup fluid to be pumped into the conduit 24 to replace any fluid which may have been lost or exhausted during operation of the hydrostatic transmission 10.

The valve assembly 54 (see FIG. 2) includes a housing or body 64 having a chamber 66 in which a ball type valve element 68 is located. The chamber 66 is connected in fluid communication with the fluid conduit 24 so that one side of the valve element 68 is exposed to the fluid pressure in the conduit 24. When the relatively high pressure fluid is being conducted through the conduit 24, the valve element 68 is pressed against an annular valve seat 76 to seal an inlet opening 76 to the chamber 66. This prevents high pressure fluid from flowing into the makeup conduit 50 from the conduit 24.

Upon the occurrence of a transient or short duration decrease in the fluid pressure in the conduit 24 to a pressure below the fluid pressure in the conduit 50, fluid is discharged from the valve assembly 54 into the conduit 24. To provide for this discharging of fluid, the valve element 68 is moved axially along a first cylindrical stage or portion 80 of the valve chamber 66 by the higher pressure of the makeup fluid in the conduit 50. As the valve element 68 moves axially along the inlet portion or stage 80 of the chamber 66, the size of an outlet cavity 84 formed between the valve element 68 and an outlet opening 88 in the housing 64 is decreased from the relatively large volume of FIG. 2 to the relatively small volume of FIG. 3. This decrease in the volume of the outlet cavity 84 results in fluid being discharged or expelled from the chamber 66 into the conduit 24. The fluid which is discharged from the chamber 66 into the conduit 24 tends to offset or compensate for the transient depression in fluid pressure in the conduit 24 so that the rate of operation of the motor 14 remains substantially constant.

Figure 2:
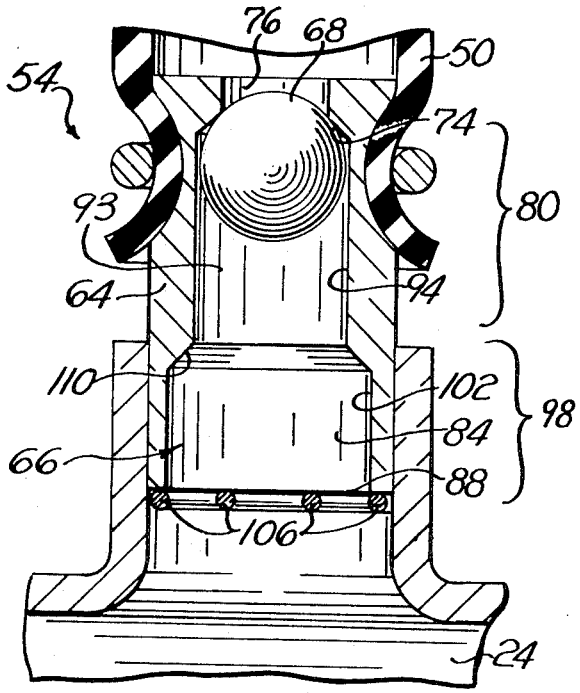
FIG. 2 is a schematic illustration of a valve assembly for controlling the flow of makeup fluid to a fluid circuit of the hydrostatic transmission and for compensating for transient or short duration decreases in fluid pressure in the fluid circuit, the valve assembly being shown in the closed condition.
Figure 3:
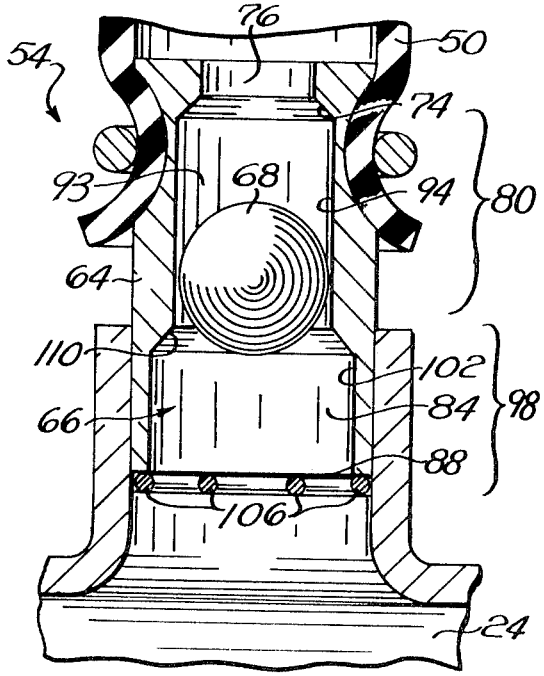
FIG. 3 is a schematic illustration of the valve assembly in FIG. 2 in an intermediate condition wherein the valve assembly is blocking a flow of makeup fluid to the fluid circuit and is compensating for a short duration decrease in the fluid pressure of the fluid circuit.

While the outlet cavity 84 is being decreased in size by the movement of the valve element 68 from the closed position of FIG. 2 to the intermediate position of FIG. 3, an inlet cavity 93 (FIG. 3) is formed nd expanded between the valve element 68 and inlet 76. This enables makeup fluid to flow into the valve housing or body 64 from the conduit 50. However, the valve element 68 cooperates with the generally cylindrical interior surface 94 of the inlet stage or portion 80 of the chamber 66 to block the flow of what is now relatively high pressure makeup fluid from the conduit 50 to the conduit 24. Accordingly, the valve element 68 has a diameter which is only slightly smaller than the diameter of the generally cylindrical surface 94 to thereby enable the valve element 68 to move freely along the cylindrical surface 94 and at the same time enable the valve element to block a flow of fluid from the inlet cavity 93 to the outlet cavity 84.

By the time the valve element 68 reaches the intermediate position shown in FIG. 3, continued operation of the motor 14 causes the fluid pressure in the conduit 24 to be increased. Since the fluid pressure in the conduit 24 has started to increase, the fluid discharged from the valve assembly 54 is no longer required to compensate for the short duration decrease in fluid pressure in the conduit. Therefore, the valve assembly 54 accepts from the conduit 24 a volume of fluid which is substantially equal to the volume of fluid previously discharged into the conduit.

To provide for acceptance of fluid from the conduit 24 by the valve assembly 54, the previous axial movement of the valve element 68 is reversed and the valve element is again pressed into sealing engagement against the valve seat 74 (see FIG. 2). During this movement of the element 68 from the intermediate position of FIG. 3 to the closed condition of FIG. 2, the outlet cavity is expanded to enable fluid to flow into the valve assembly 54 from the conduit 24. In addition, the inlet cavity 93 is decreased in size to expel the makeup fluid contained therein into the fluid conduit 50. It should be noted that the axial extent of the inlet stage portion 80 of the chamber 66 is long enough so that previously described transient variations in the fluid pressure in the conduit 24 due to instantaneous variations in the displacement of the motor 14 are of insufficient duration to enable the valve element 68 to move from the inlet portion or stage 80 of the valve assembly to an outlet portion or stage 98 of the valve assembly.

After the fluid circuit has been exhausted when the direction of operation of the pump 12 is reversed, the conduit 24 conducts relatively low pressure fluid. When it is necessary to add makeup fluid to the relatively low pressure fluid flowing through the conduit 24, the pressure of fluid in the conduit is below the pressure of the fluid in the makeup conduit 50. Therefore, the valve element 68 is moved out of sealing engagement with the valve seat 74 to the intermediate position shown in FIG. 3. Since the decrease or depression of the fluid pressure in the conduit 24 lasts for a relatively long period of time, the valve element 64 moves axially past the intermediate position of FIG. 3 to the open position of FIG. 4.

Figure 4:
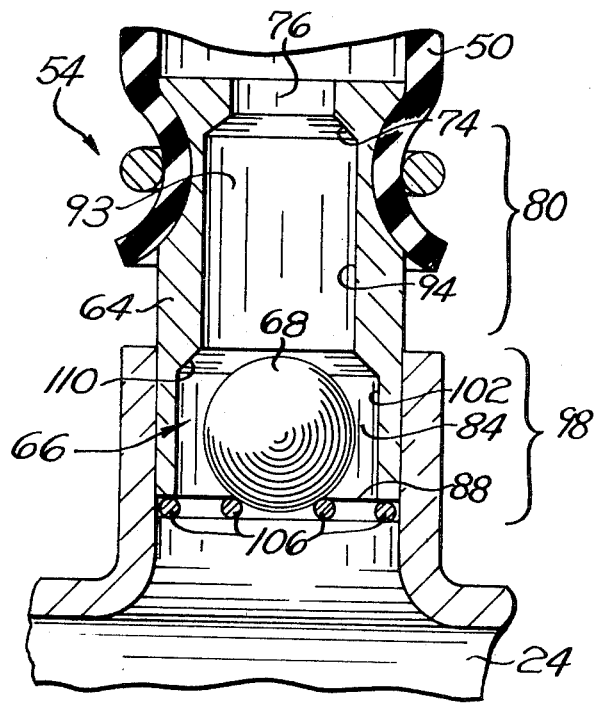
FIG. 4 is a schematic illustration of the valve assembly of FIGS. 2 and 3 in an open condition in which makeup fluid is being added to the fluid circuit.

In the open position of FIG. 4, the valve element 68 is located in the outlet stage or portion 98 of the valve chamber 66. The outlet portion 98 has a generally cylindrical surface 102 with a diameter which is substantially greater than the diameter of the valve element 68. Therefore, when the valve element 68 is in the open position, makeup fluid flows from the conduit 50 through the inlet portion 80 of the chamber 66, around the valve element 68 and through the outlet portion 98 of the chamber 66 to the conduit 24. It should be noted that suitable retaining elements 106 are provided at the outlet 88 of the camber 66 to retain the valve element 68 in the housing 64.

When exhausted fluid is replaced or the direction of rotation of the pump 12 is reversed, the valve element 68 is again exposed to a relatively high pressure. This high pressure moves the valve element 68 axially from the open position of FIG. 4 to the closed position of FIG. 2. Movement of the valve element or ball 68 from the open position to the closed position is facilitated by the provision of a tapered guide surface 110 between the inlet portion 80 and outlet portion 98 of the chamber 66.

The valve assembly 52 is identical in construction to the valve assembly 54 an responds to the presence of both transient and long duration depression in the pressure in the conduit 26 in the same manner as the valve assembly 54. The valve assembly 52 includes a valve element 114 (FIG. 1) which is located in a housing 116 which defines a valve chamber 117. The valve chamber 117 has a relatively small diameter inlet cavity 118 and a relatively large diameter outlet cavity 120. The valve element 114 is moved to an intermediate position similar to the intermediate position illustrated in FIG. 3 for the valve element 68 when the fluid pressure in the conduit 26 is decreased to a pressure below the fluid pressure in the makeup conduit 50. If the decrease in fluid pressure in the conduit 26 is transient or of short duration, the valve element 114 returns to a closed condition similar to that illustrated in FIG. 2 for the valve element 68. However, if the decrease in fluid pressure in the conduit 26 is of a relatively long duration condition, the valve element 114 is moved to the open condition of FIG. 1 to enable makeup fluid to be conducted from the conduit 50 through the valve assembly 52 to the conduit 26.

Figure 5:
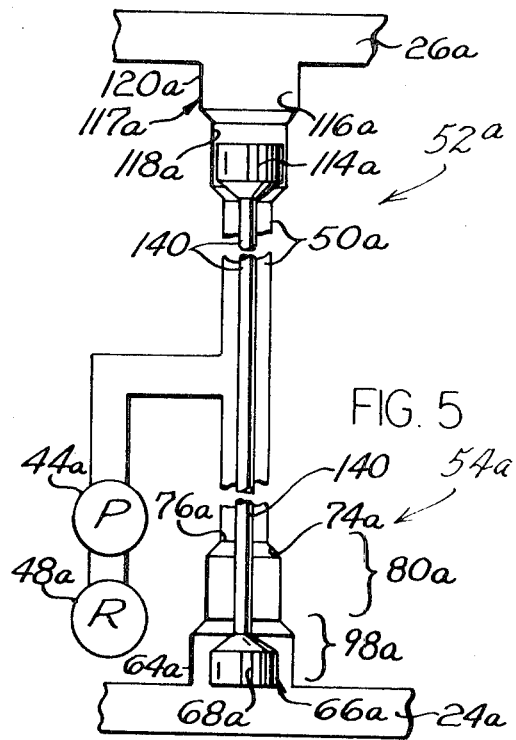
FIG. 5 is a schematic illustration of a second embodiment of the invention.

A second embodiment of the invention is illustrated in FIG. 5. Since the construction and mode of operation of this embodiment of the invention is substantially the same as previously described in connection with FIGS. 1 to 4, numerals similar to those used to designate the elements of FIGS. 1—4 will be used to designate the elements of FIG. 5. To avoid confusion, the suffix letter A will be added to the numerals associated with FIG. 5.

In the embodiment of the invention illustrated in FIG. 5, a pair of valve assemblies 52a and 54a control the flow of fluid from the pump 44a to the conduits 26a and 24a. The valve assemblies 52a and 54a are connected by a conduit 50a with a makeup pump 44a. The valve assemblies 52a and 54a compensate for transient or short duration decreases in the fluid pressure in the conduits 24a and 26a in much the same manner previously explained in connection with the valve assemblies 52 and 54.

The valve assembly 54a includes a valve element 68a located in a chamber 66a in a housing 64a. The valve element 68a is movable between the open condition illustrated in FIG. 5 and a closed condition in which the valve element 68a sealingly engages a valve seat 74a which circumscribes an inlet 76a to the housing or body 64a. The chamber 66a is divided into two stages or portions, that is a relatively small diameter inlet stage or portion 80a and a relatively large diameter outlet stage or portion 98a. When the valve element 68a is in the open position of FIG. 5, fluid can flow from the makeup pump 44a through the conduit 50a and inlet portion 80a of the valve assembly 54a. The fluid then flows around the valve element 68a and through the outlet portion 98a of the valve assembly 54a into the conduit 24a which is conducting relatively low pressure fluid to which makeup fluid must be added.

The valve assembly 52a includes a valve element 114a which is located in a body or housing 116a defining a valve chamber 117a. The chamber 117a has a relatively small diameter first or inlet portion 118a and relatively large diameter second or outlet portion 120a. The valve element 114a is connected with the valve element 68a by a connector member 140 which extends through the conduit 50a between the valve assemblies 52a and 54a.

The connector member 140 interconnects the valve elements 114a and 68a so that the valve assembly 52a is in the closed condition of FIG. 5 when the valve assembly 54a is in the open condition. Similarly, when the valve assembly 54a is in a closed condition, the connector member 140 moves the valve element 114a to the open condition. It should be noted that the valve assemblies 52a and 54a compensate for transient or short duration decreases or depressions in the relatively high fluid pressure in the conduits 26a and 24a by discharging fluid from the valve assemblies into the conduits. This is accomplished in the case of the conduit 26a by movement of the valve element 114a outwardly from a closed position illustrated in FIG. 5 to an intermediate position, similar to that illustrated in FIG. 3 for the valve assembly 54. At the end of the short duration increase in pressure, fluid will flow form the conduit 26a into the valve assembly 52a is that there is no net effective addition of fluid to the conduit 26a in response to the transient or short duration depression in the fluid pressure in the conduit 26a. Of course, when the conduit 24a is conducting relatively high pressure fluid and the conduit 26a connecting low pressure fluid the valve assembly 54a responds in the same manner to a transient or short duration depression or decrease in the pressure in the conduit 24a.

In view of the foregoing description, it can be seen that each of the valve assemblies 52 and 54 compensates for short duration or transient decreases in the fluid pressure in the fluid circuit 16 between the pump and motor of a hydrostatic transmission by discharging fluid from the valve assembly into the fluid circuit during the transient decrease in fluid pressure. At the end of the short duration or transient decrease in fluid pressure, the fluid flows from the fluid circuit 16 into the valve assembly so that there is a substantially zero net addition of fluid to the fluid circuit. In this manner each of the valve assemblies 52 and 54 compensate for short duration decreases in the fluid pressure in the circuit 16 without adding unnecessary makeup fluid to the circuit. Due to this compensation for short duration or transient decreases in the fluid pressure in the fluid circuit 16 between the pump 12 and motor 14, the operation of the motor is relatively smooth even through the instantaneous displacement of the motor varies. Of course, the valve assembles 52 and 54 compensate for transient variations in the fluid pressure in the fluid circuit 16 which are caused by sources other than instantaneous variations in the displacement of the motor 14.

Having described my invention, I claim:

1. A hydrostatic transmission assembly comprising a fluid pump, a fluid motor, first fluid conduit means for conducting fluid between said pump and motor upon operation of said pump to thereby operate said motor, second fluid conduit means for connecting said first fluid conduit means in fluid communication with a source of fluid, and valve means connected in fluid communication with said first and second fluid conduit means and operable between open and closed conditions under the influence of pressure differentials of relatively long duration between said first and second fluid conduit means to thereby control fluid flow between said first and second fluid conduit means, said valve means including means for discharging fluid from said valve means into said first fluid conduit means under the influence of a relatively short duration decrease in the pressure in said first fluid conduit means to a pressure below the pressure in said second fluid conduit means and for accepting fluid from said first fluid conduit means at the end of the relatively short duration decrease in the pressure in said first fluid conduit means to thereby tend to minimize the effect of the relatively short duration decrease in the fluid pressure in said first fluid conduit means.

2. A hydrostatic transmission assembly as set forth in claim 1 wherein said valve means includes a valve body defining a chamber connected in fluid communication with said first and second fluid conduit means and a movable valve element located in said chamber, said chamber including a first portion having a cross-sectional area which is substantially the same as the cross-sectional area of said valve element and a second portion having a cross-sectional area which is substantially larger than the cross-sectional area of said valve element, said first portion of said chamber and said valve element cooperating to block a flow of fluid between said first and second fluid conduit means and to form a cavity which is contractable and expansible by movement of said valve element relative to said valve body to provide said means for discharging and accepting fluid.

3. A hydrostatic transmission as set forth in claim 1 wherein said means for discharging and accepting fluid includes cavity means which is contractable from a first condition to a second condition to discharge fluid from said valve means into said first fluid conduit means and is expandable from said second condition to said first condition to accept fluid from said first fluid conduit means.

4. A hydrostatic transmission assembly as set forth in claim 1 wherein said valve means includes a valve body defining a chamber having a first portion of a relatively large cross-sectional area, and a valve element movable in said first portion of said chamber to provide for said discharging and accepting of fluid, said valve element being movable from said first portion to said second portion of said chamber to provide for operation of said valve means from said closed condition to said open condition.

5. A hydrostatic transmission as set forth in claim 1 wherein said valve means includes a valve body defining a chamber having an inlet connected in fluid communication with said second fluid conduit means and an outlet connected in fluid communication with said first fluid conduit means, a valve element movable in said chamber, said means for discharging and accepting fluid including an expansible cavity formed in a portion of said chamber by said valve element and connected in fluid communication with said outlet, said valve element being movable in a first direction upon the occurrence of a relatively short duration decrease in the pressure in said first fluid conduit means to a pressure below the pressure in said second fluid conduit means to contract said cavity and discharge fluid from said valve body, said valve element being movable in a second direction opposite from said first direction at the end of the relatively short duration decrease in pressure to expand said cavity and accept fluid from said first fluid conduit means.

6. A hydrostatic transmission assembly comprising a fluid pump, a fluid motor, first fluid conduit means for conducting fluid between said pump and motor upon operation of said pump to thereby operate said motor, second fluid conduit means for connecting said first fluid conduit means in fluid communication with a source of fluid, and valve means connected in fluid communication with said first and second fluid conduit means for controlling fluid flow between said first and second fluid conduit means, said valve means including a body connected in fluid communication with said first and second fluid conduit means and means responsive to a short duration decrease in the fluid pressure in said first fluid conduit means to a fluid pressure below the fluid pressure in said second fluid conduit means for blocking fluid flow from said second fluid conduit means into said first fluid conduit means and discharging fluid from said body into said first fluid conduit means during the short duration decrease in fluid pressure in said first fluid conduit means and for blocking fluid flow from said first fluid conduit means into said second fluid conduit means and accepting fluid from said first fluid conduit means at the end of the short duration decrease in the fluid pressure in said first fluid conduit means to thereby at least partially compensate for the short duration decrease in fluid pressure in said first fluid conduit means, said means responsive to a short duration decrease in the fluid pressure in said first fluid conduit means also being responsive to a relatively long duration decrease in the fluid pressure in said first fluid conduit means to a fluid pressure below the fluid pressure in said second fluid conduit means to enable fluid to flow from said second fluid conduit means to said first fluid conduit means.

7. A hydrostatic transmission assembly as set forth in claim 6 wherein said means responsive to a short duration decrease in the fluid pressure in said first fluid conduit means includes a movable valve element for blocking fluid flow between said first and second fluid conduit means, said valve element being located in a chamber defined by said body and cooperating with said body to define a cavity in said chamber, said valve element being movable in a first direction under the influence of the pressure differential between said first and second fluid conduit means during the short duration decrease in fluid pressure in said first fluid conduit means to contract said cavity and thereby discharge fluid from said vicinity into said first fluid conduit means, said valve element being movable in a second direction opposite to said first direction under the influence of a pressure differential between the first and second fluid conduit means to expand said cavity and to accept therein fluid from said first fluid conduit means at the end of the short duration decrease in fluid pressure in said first fluid conduit means, said valve element cooperating with said valve body during the short duration decrease in fluid pressure in said first fluid conduit means to block fluid flow between said first and second fluid conduit means.

8. A hydrostatic transmission assembly as set forth in claim 7 wherein said valve element is movable for a relatively large distance in said first direction under the influence of a relatively long duration decrease in the fluid pressure in said first fluid conduit means to a fluid pressure below the fluid pressure in said second fluid conduit means to move said valve element to a position in which it enables fluid to flow from said second fluid conduit means to said first fluid conduit means.

9. A hydrostatic transmission assembly as set forth in claim 7 wherein said valve element cooperates with said body to define another cavity in said chamber, said other cavity being connected in fluid communication with said second fluid conduit means and being expanded by movement of said valve element in said first direction during the sort duration decrease in fluid pressure in said first fluid conduit means to accept in said other cavity fluid from said second fluid conduit means during the short duration decrease in fluid pressure in said first fluid conduit means, said other cavity being contracted by movement of said valve element in said second duration at the end of the short duration decrease in fluid pressure in said first fluid conduit means to thereby discharge accepted fluid from said second fluid conduit means back into said second fluid conduit means.

10. A hydrostatic transmission assembly comprising a fluid pump, a fluid motor, first fluid conduit mean for conducting fluid between said pump and motor, said motor means having an inherent displacement variation during low speed operation resulting in a short duration pressure decrease in said first fluid conduit means, second fluid conduit means for connecting said first fluid conduit means in fluid communication with source of fluid, and compensating means including a body connected in fluid communication with said first and second fluid conduit means, said compensating means being responsive to the short duration decrease in the fluid pressure in said first fluid conduit means to a fluid pressure below the fluid pressure in said second fluid conduit means for discharging fluid from said body into said first fluid conduit means during the short duration decrease in fluid pressure in said first fluid conduit means and for accepting fluid from said first fluid conduit means at the end of the short duration decrease in the fluid pressure in said first fluid conduit means to thereby at least partially compensate for the short duration decrease in fluid pressure in said first fluid conduit means, said compensating means including a movable element located in a chamber defined by said body and cooperating with said body to define a cavity in said chamber, said element being movable in a first direction under the influence of the short duration decrease in fluid pressure in said first fluid conduit means to contract said cavity and thereby discharge fluid from said cavity into said first fluid conduit means, said element being movable in a second direction opposite to said first direction under the influence of the fluid pressure in said first fluid conduit means to expand said cavity and to accept therein fluid from said first fluid conduit means at the end of the short duration decrease in fluid pressure in said first fluid conduit means.

11. A hydrostatic transmission assembly comprising a reversible fluid pump, a reversible fluid motor, first fluid conduit means for conducting high pressure fluid from said pump to said motor during operation of said pump in one direction and for conducting relatively low pressure fluid from said motor to said pump during operation of said pump in an opposite direction, second fluid conduit means for conducting relatively low pressure fluid from said motor to said pump during operation of said pump in said one direction and for conducting relatively high pressure fluid from said pump to said motor during operation of said pump in said opposite direction, third fluid conduit means for connecting said first and second fluid conduit means in fluid communication with a relatively low pressure source of fluid, first valve means connected in fluid communication with said first and third fluid conduit means for controlling fluid flow between said first and third fluid conduit means, second valve means connected in fluid communication with said second and third fluid conduit means for controlling fluid flow between said second and third fluid conduit means, said first valve means including a first body connected in fluid communication with said first and third fluid conduit means and first means responsive to a short duration decrease in the fluid pressure in said first fluid conduit means to a fluid pressure below the fluid pressure in said third fluid conduit means while said pump is operating in said one direction for blocking fluid flow from said this fluid conduit means into said first fluid conduit means and discharging fluid from said first body into said first fluid conduit means during the short duration decrease in the fluid pressure in said first fluid conduit means while said pump is operating in said one direction and for blocking fluid flow from said first fluid conduit means into said third fluid conduit means and accepting fluid from said first fluid conduit at the end of the short duration decrease in the fluid pressure in said first fluid conduit means while said pump is operating in said one direction to thereby at least partially compensate for the short duration decrease in fluid pressure in said first fluid conduit means, said first means also being responsive to a relatively long duration decrease in the fluid pressure in said first fluid conduit means to a pressure below the fluid pressure in said third fluid conduit means while said first fluid conduit means is conducting relatively low pressure fluid from said motor to said pump during operation of said pump in said opposite direction to enable fluid to flow from said third fluid conduit means to said first fluid conduit means, said second valve means including a second body connected in fluid communication with said second and third fluid conduit means and second mans responsive to a short duration decrease in the fluid pressure in said second fluid conduit means to a fluid pressure below the fluid pressure in said third fluid conduit means while said pump is operating in said opposite direction for blocking fluid flow from said third fluid conduit means to said second fluid conduit means and discharging fluid from said second body into said second fluid conduit means during the short duration decrease in the fluid pressure in said second fluid conduit means while said pump is operating in said opposite direction, and for blocking fluid flow from said second fluid conduit means and accepting fluid from said second fluid conduit means at the end of the short duration decrease in fluid pressure in said second fluid conduit means while said pump is operating in said opposite direction to thereby at least partially compensate for the short duration decrease in the fluid pressure in said second fluid conduit means, said second means also being responsive to a relatively long duration decrease in the fluid pressure in said second fluid conduit means to a fluid pressure below the fluid pressure in said third fluid conduit means while said second fluid conduit means is conducting relatively low pressure fluid from said motor to said pump during operation of said pump in said one direction to enable fluid to flow from said third fluid conduit means to said second fluid conduit means.

12. A hydrostatic transmission assembly as set forth in claim 11 wherein said first and second valve means each include a valve element movably mounted in a chamber defined by the body of the associated valve means, and said hydrostatic transmission assembly further includes a connector element operatively interconnecting said valve element of said first and second valve means in such a manner that when said first valve means is in an open condition enabling fluid to flow from said third fluid conduit means to said first fluid conduit means said second valve means is in a closed condition blocking fluid flow from said third fluid conduit means to said second fluid conduit means and such that when said second valve means is in an open condition enabling fluid to flow from said third fluid conduit means to said second fluid conduit means, said first valve means is in a closed condition blocking fluid flow from said third fluid conduit means to said first fluid conduit means.

13. A hydrostatic transmission assembly comprising a fluid pump, a fluid motor, first fluid conduit means for conducting fluid between said pump and motor upon operation of said pump to thereby operate said motor second fluid conduit means for connecting said first fluid conduit means in fluid communication with a source of fluid, and valve means connected in fluid communication with said first and second fluid conduit means and operable between open and closed conditions under the influence of pressure differentials of relatively long duration between said first and second fluid conduit means to thereby control fluid flow between said first and second fluid conduit means, said valve means including means for retaining fluid flowing from said second fluid conduit means into said valve means under the influence of a relatively short duration variation in the pressure differential between said first and second fluid conduit means and for discharging the retained fluid from said valve means back into said second fluid conduit means at the end of the relatively short duration variation in the pressure differential between said first and second fluid conduit means to thereby tend to minimize the effect of relatively short duration variations in the pressure in said first fluid conduit means on the operation of said motor.

14. A hydrostatic transmission assembly as set forth in claim 13 wherein said valve means includes a valve body defining a chamber connected in fluid communication with said first and second fluid conduit means and a movable valve element located in said chamber, said chamber including a first portion having a cross-sectional area which is substantially the same as the cross-sectional area of said valve element and a second portion having a cross-sectional area which is substantially larger than the cross sectional area of said valve element, said first portion of said chamber and said valve element cooperating to substantially block a flow of fluid between said first and second fluid conduit means and to form a cavity which is expansible and contractable by movement of said valve element relative to said valve body to provide some means for retaining and discharging fluid, said second portion of said chamber and said valve element cooperating to enable fluid to flow between said first and second fluid conduit means.

15. A hydrostatic transmission assembly as set forth in claim 13 wherein said means for retaining and discharging fluid includes cavity means which is expansible from a contracted condition to an expanded condition to hold fluid which flows into said valve means from said second fluid conduit means and to discharge fluid from said valve means into said first fluid conduit means, said vicinity means being contractable from the expanded condition to the contracted condition to discharge fluid from said valve means into said second fluid conduit means and to enable fluid to flow from said first fluid conduit means into said valve means.

16. A hydrostatic transmission assembly as set forth in claim 13 wherein said valve means include s a valve body defining a chamber having an inlet connected in fluid communication with said second fluid conduit means and an outlet connected in fluid communication with said first fluid conduit means, and a valve element movable in said chamber, said means for retaining and discharging fluid including an expansible cavity formed in a portion of said chamber by said valve element and connected in fluid communication with said second fluid conduit means through said inlet, said valve element being movable in a first direction upon the occurrence of a relatively short duration variation in the pressure differential between said first and second fluid conduit means to expand said cavity while blocking a flow of fluid from said inlet to said outlet to thereby retain fluid flowing into said valve body from said second fluid conduit means, said valve element being movable in a second direction opposite from said first direction at the end of the relatively short duration variation in the pressure differential between said first and second fluid conduit means to contract said cavity while blocking a flow of fluid from said inlet to said outlet to thereby discharge retained fluid from said cavity into said second fluid conduit means.

17. A hydrostatic transmission assembly as set forth in claim 16 wherein said valve element is movable through a relatively short distance in said first direction under the influence of a relatively short duration variation in the pressure differential between said first and second fluid conduit means and is movable through a relatively large distance in said first direction under the influence of a pressure differential of a relatively long duration between said first and second fluid conduit means to thereby move said valve element into a position enabling fluid to flow from said inlet to said outlet.

UNITED STATES PATENT OFFICE
CERTIFICATE OF CORRECTION

Patent No. 3,584,460           Dated   June 15, 1971

Inventor(s)   Keith A. Boyd

It is certified that error appears in the above-identified patent and that said Letters Patent are hereby corrected as shown below:

Column 8, line 4, for "vicinity" read -- cavity --.
Column 9, line 22, for "this" read -- third --; column 9, line 44, for "mans" read -- means --.
Column 10, line 13, insert a comma (,) after "motor"; column 10, line 56, for "vicinity" read -- cavity --.

Signed and sealed this 14th day of December 1971.

(SEAL)
Attest:

EDWARD M. FLETCHER, JR.          ROBERT GOTTSCHALK
Attesting Officer                Acting Commissioner of Patents